United States Patent [19]
Denzel et al.

[11] Patent Number: 5,574,885
[45] Date of Patent: Nov. 12, 1996

[54] MODULAR BUFFER MEMORY WITH SEPARATELY CONTROLLABLE LOGICAL OUTPUT QUEUES FOR USE IN PACKET SWITCHED NETWORKS

[75] Inventors: Wolfgang E. Denzel, Au-Waedenswil; Antonius J. Engbersen, Richterswil; Gunnar Karlsson, Rueschlikon, all of Switzerland

[73] Assignee: International Business Machines Corporation, Armonk, N.Y.

[21] Appl. No.: 341,467

[22] Filed: Nov. 17, 1994

Related U.S. Application Data

[63] Continuation of Ser. No. 779,745, Oct. 21, 1991, abandoned.

[30] Foreign Application Priority Data

Dec. 20, 1990 [EP] European Pat. Off. ............. 90811014

[51] Int. Cl.$^6$ .................................................. G06F 13/18
[52] U.S. Cl. ...................... 395/492; 395/437; 395/856; 395/872; 370/60; 370/74.1
[58] Field of Search .................................. 395/437, 492, 395/856, 872; 370/60, 94.1

[56] References Cited

U.S. PATENT DOCUMENTS

| | | | |
|---|---|---|---|
| 4,158,235 | 6/1979 | Call et al. | 395/425 |
| 4,353,129 | 10/1982 | Nishiwaki | 375/112 |
| 4,556,972 | 12/1985 | Chan et al. | 370/60 |
| 4,839,366 | 6/1989 | Ward et al. | 365/227 |
| 4,847,812 | 7/1989 | Lodhi | 365/221 |
| 4,862,461 | 8/1989 | Blaner | 371/33 |
| 4,876,681 | 10/1989 | Hagiwara et al. | 370/60 |
| 4,932,020 | 6/1990 | Pashan et al. | 370/60 |
| 4,991,171 | 2/1991 | Teraslinna et al. | 370/94.1 |
| 5,016,248 | 5/1991 | Kudoh | 370/94.1 |
| 5,046,051 | 9/1991 | Doornhein et al. | 365/221 |
| 5,282,201 | 1/1994 | Frank et al. | 370/94.1 |

FOREIGN PATENT DOCUMENTS

| | | |
|---|---|---|
| 0020255 | 12/1980 | European Pat. Off. . |
| 0336598 | 10/1989 | European Pat. Off. . |

OTHER PUBLICATIONS

Proceedings of the 1986 International Conference on Parallel Processing, Pennsylvania, 19–22 Aug. 1986, pp. 397–400, IEEE, New York, T. A. Chu et al, "Design of VLSI Asynchronous FIFO Queues for Packet Communication Networks".

*Primary Examiner*—Reba I. Elmore
*Attorney, Agent, or Firm*—Edward H. Duffield; John J. Timar

[57] ABSTRACT

A modular system for a buffer memory used for storing output queues (80$a$–$k$) of a packet switch is described. A series of memories (90) are each connected to both the input lines (10$a$–$k$) and the output lines (160$a$–$k$) of the switch. Each memory (90) is provided with a memory controller (100) connected to a latch (50) which is in turn connected to AND gates (60$a$–$k$). These AND gates (60$a$–$k$) ensure that packets are only stored in the memory (90) of the module in which the first latch (50) is set. When the memory (90) is full, the memory controller (100) resets this first latch (50) in the current module and sets the corresponding first latch (50) in the next module. The packets are then read into the memory (90) of the next module. A marker circuit (70) is used to insert in the output queues (80$a$–$k$) a marker to indicate that the next entries of the queue are to be found in the next module. On reading out the packets, this marker is detected by a detector (110$a$–$k$) which then resets a second latch (140$a$–$k$) in the module from which the packets are currently being read and sets a corresponding second latch (140$a$–$k$) in the next module. AND gates (150$a$–$k$) ensure that packets are only read out of those output buffer queues (80$a$–$k$) whose corresponding second latch (140$a$–$k$) is set. Each of the switch output lines (160$a$–$k$) can therefore only receive packets from one module. Different switch output lines (160$a$–$k$) will, however, receive packets from different modules.

5 Claims, 2 Drawing Sheets

MODULAR BUFFER MEMORY WITH SEPARATELY CONTROLLABLE LOGICAL OUTPUT QUEUES FOR USE IN PACKET SWITCHED NETWORKS

This application is a continuation of application Ser. No. 07/779,745, filed Oct. 21, 1991, and now abandoned.

FIELD OF THE INVENTION

This invention relates to buffer memories for use in packet switched networks and, in particular, to ways of sharing buffer memory used for storing packets of data within the switches of packet switched networks.

BACKGROUND

The function of a switch in a packet switched network is to collect all the incoming packets of data and to switch them to the correct output pods of the switch. Since it is possible that at any particular moment packets arriving at two or more input ports are directed to the same output port, it is necessary to provide a buffer memory within each switch to temporarily store packets while the output pods to which they are sent are being used to transmit other packets. There are many ways known in the prior art of providing such memories. The most basic of these is to provide a separate first-in first-out (FIFO} memory at each output port. In this design, any packets directed to the output port are first placed in the FIFO queue where they are held until all previously arriving packets have been output. Such a system is, however, very wasteful of memory space since it requires the provision of a fixed memory size at each output pod. Thus the FIFO queue at one heavily used output pod could easily become full and unable to store any more packets while queues at adjacent, less heavily used, output pods still have lots of space available.

One means of overcoming this inefficient use of memory space is to use a single shared random access memory (RAM). Instead of using fixed partitions to divide the memory up into areas reserved for use by each output pod, the partition boundaries are made flexible so that FIFO queues requiring extra memory space are allowed to make use of unused memory space throughout the RAM. While this improves the throughput of packets, as fewer packets are lost merely because the output queue at one heavily used output pod is full, fairly sophisticated memory management techniques are required to reorganize fragmented memory after some period of operation.

In the IBM Technical Disclosure Bulletin, vol 32, no 3B, August, 1989, pp 488–492, an article entitled 'Algorithm for managing multiple First-in First-out queues from a single shared random access memory' describes an algorithm which avoids the 'garbage-collection' operation of reorganizing the fragmented memory required by the technique described above. In this disclosure, a first RAM is used to store all the packets and a second RAM is used to store a pointer which indicates the locations of packets in the output queue. The system works by having a register at every output pod to indicate the address in the first RAM from which the next packet is to be read. This register is updated while the packet is being transmitted by reading, from the second RAM at the same address as the address at which the packet was stored in the first RAM, the address at which the next packet in the output queue is stored. While this memory arrangement offers advantages over previously known systems, the provision of the second memory requires extra hardware overhead. In addition, since the size of the first RAM will be fixed by design considerations, expansion of the system by adding new output pods and input pods will only be possible if one is prepared to accept the accompanying possible extra data loss, as the memory itself cannot be increased in size.

SUMMARY OF THE INVENTION

The object of the invention is to provide a first-in first-out buffer memory for use in a data packet switch which can be easily expanded as the amount of data passing through the switch increases without requiring the use of either complicated algorithms or substantial extra hardware.

The invention achieves this objects by building the output queues of the switch from a series of memory modules, each one of which can be accessed by all of the input pods and from which data can be read to any of the output pods. The packets to be addressed to the output pods are read into one of the memory modules until the particular module is full. The next data packets are then read into the next available free space in another memory module and a marker is placed in the first module to indicate that the queue continues in the next available module. On reading the data out of one module, the marker will be detected and thus the system knows to stop reading data out of this module and to look for further queue entries in the next module.

The invention requires very little extra hardware overhead and yet is able to fully utilize all available memory space. Its modular construction means that should any switch be continuously overloaded and thus suffer from data-loss problems, its available buffer memory can be easily expanded. The extremely shod switching time between memory modules ensures that no data cycles need to be lost when one memory module is full and packets need to be read into another memory module.

DETAILED DESCRIPTION OF THE INVENTION

Figure 1:
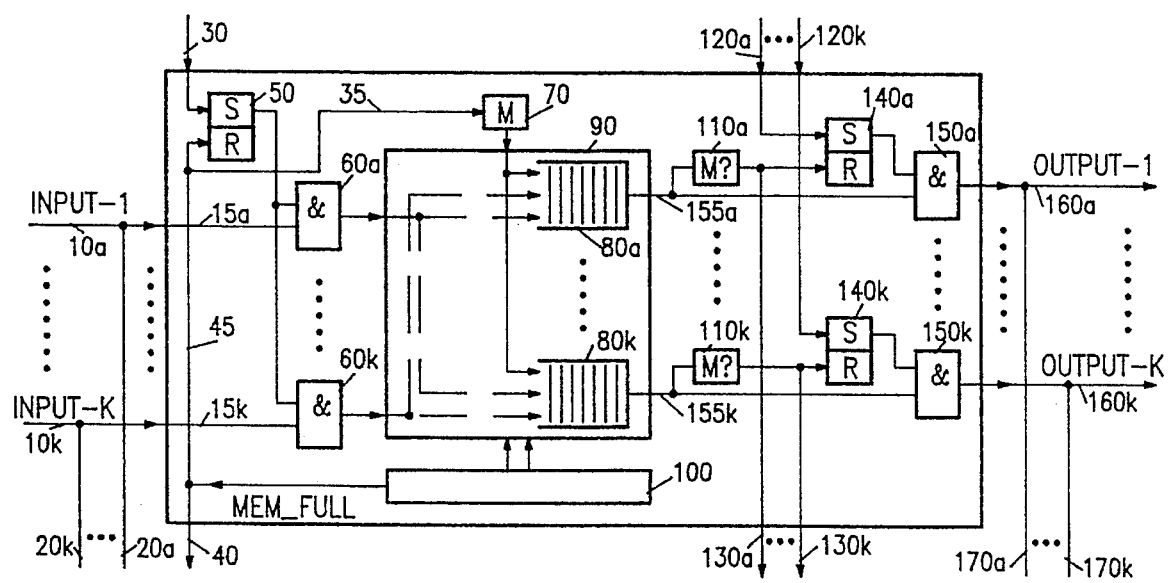
FIG. 1 illustrates the structure of one memory module of the modular buffer memory according to the invention.

The structure of one memory module of a modular buffer memory is shown in FIG. 1. Packets of data for storage in the buffer memory are input on one of a series of k input lines 10a–k. Each of these input lines 10a–k is connected not only to module input lines 15a–k of one memory module but, through lines 20a–k, to other memory modules. Similarly switch output lines 160a–k are connected through lines 170a–k to the other memory modules. This can be seen more clearly by considering FIG. 2

Each of the input lines 15a–k is connected to one of a series of AND gates 60a–k whose other input is connected to the output of a first set-reset latch 50. The outputs of the AND gates 60a–k are connected to the data inputs of a multi-input pod and multi-output pod memory 90. This memory 90 can be formed of any multi-pod memory known in the prior ad. Memory controller 100 controls the internal organization of the memory and creates output buffer queues 80a–k within the memory 90 to store all data packets to be output. Each of the output buffer queues 80a–k is provided with a memory output line 155a–k which is connected to AND gates 150a–k whose other input comes from a series of second set-reset latches 140a–k. The switch output lines 160a–k are connected to the output of the AND gates 150a–k. The set input of the first latch 50 is connected through line 30 to a line 40 of the previous memory module. Similarly the set inputs of the second latches 140a–k are connected through lines 120a–k to the corresponding lines 130a–k of the previous module.

The operation of the memory module will now be explained by pre-supposing that none of the memory modules currently store any packets and that the first packets to arrive will be stored in the module shown in FIG. 1. In this case the latch 50 is set and thus the AND gates 60a–k will directly pass any incoming packets on input lines 15a–k to the memory 90. The memory controller 100 ensures the incoming packets are placed in the correct output queues 80a–k from where they are output along memory output lines 155a–k to AND gates 150a–k. The assumption will also be made that no packets are currently being output from other modules and thus that all of the latches 140a–k are set. Hence the data packets can pass through AND gates 150a–k to be output on switch output lines 160a–k.

Data packets will continue to be input into the memory along input lines 10a–k until the memory is full. This is signalled by the memory controller 100 outputting a MEM_FULL signal. In order to avoid any loss of data, the MEM_FULL signal is preferably sent when the number of available memory cells in the memory 90 falls below k, the number necessary to cope with the worst possible case of one packet arriving at every input. This can be detected almost a cycle ahead of time and thus the next module can have ample time to prepare for service.

The MEM_FULL signal is passed to the reset input of the first latch 50 via line 45 where it resets the first latch 50 and thus blocks the further passage of packets through the AND gates 60a–k. It should be noted that the latch 50 can only be set or reset while packets are passing through the AND gates 60a–k. Thus the lines 15a–k cannot be turned off during the arrival of packets. It is also passed along the line 40 to set the corresponding first latch 50 of the next memory module. Setting the first latch 50 in the next memory module enables data to be passed through the corresponding AND gates 60a–k of the next memory module and thus into the memory 90 of the next memory module. Packets therefore arriving at the input lines 10a–k are transferred along lines 20a–k to the next module. Since only one first latch 50 in any memory module is set at any one time, all packets are read only into the memory 90 of one memory module.

The MEM_FULL signal is also passed to a marker circuit 70 via line 35 which places markers into all of the output queues 80a–k to signal the end of queue storage in the memory module and that further entries in the queue will be found in subsequent modules. These markers can either be formed of a special code word, which is handled like a normal output queue entry, or as a single bit to be stored in a reserved bit within the normal queue entries.

Reading out the entries from the output buffer queues 80a–k contained within the memory 90 to the output of the switch requires the series of second latches 140a–k to be set so that the packets can pass through the AND gates 150a–k. The latches remain set and thus entries from the output buffer queues 80a–k are output along memory output lines 155a–k to switch output lines 160a–k until the presence of the marker is detected by one of a series of detectors 110a–k. The second latches 140a–k cannot be set or reset while packets are being output along the memory output lines 155a–k. The respective detector 110a–k sends a signal which resets the respective second latch 140a–k in the current memory module and sets, via lines 130a–k, the corresponding second latch 140a–k in the next memory module. Thus, stored packets continue to be output on the switch output lines 160a–k but they now come from the corresponding output buffer queue 80a–k of the next memory module. It should be noted that packets are read out from each of the output buffer queues 80a–k independently of all other output buffer queues 80a–k. The detection of a marker in one of the output buffer queues 80a–k does not result in all of the series of second latches 140a–k being reset, but only in resetting that latch 140a–k connected to the particular output buffer queue 80a–k. Thus it is possible that packets being read out on lines 160a–k have been stored in different memory modules.

Figure 2:
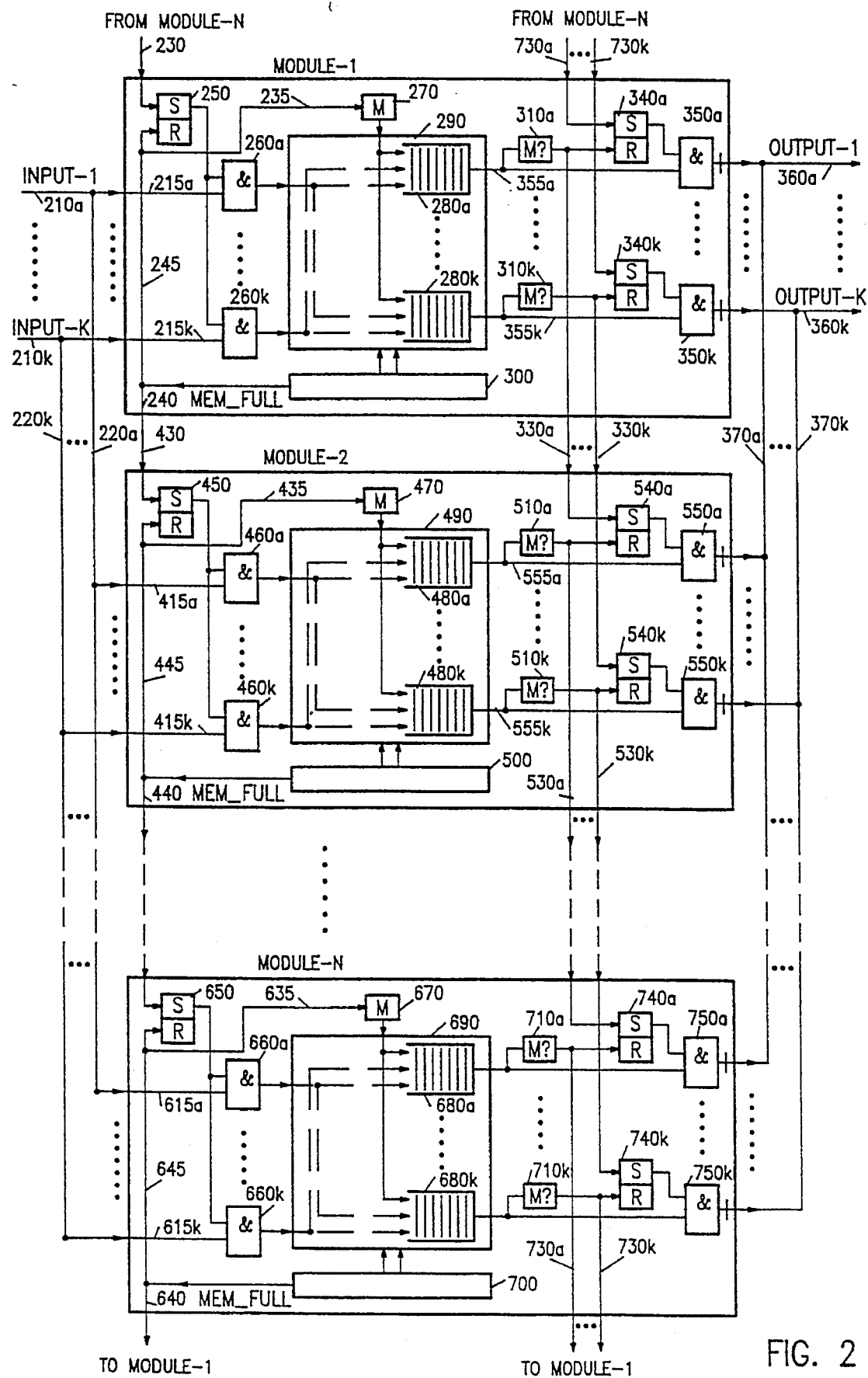
FIG. 2 illustrates how the memory modules of FIG. 1 are connected together.

FIG. 2 shows how a number of the above described memory modules are connected together. The reference numbers used in FIG. 1 are applied to the corresponding elements of FIG. 2 except that for a first module they are increased by 200, for a second module by 400 and for an nth module by 600. In FIG. 2, it can be seen that the inputs 210a–k are connected to the input lines 215a–k, 415a–k and 615a–k of all the modules through lines 220a–k. Similarly, output lines 355a–k, 555a–k and 755a–k are connected through AND gates 350a–k, 550a–k and 750a–k to the switch output lines 360a–k through lines 370a–k. Lines 240, 440 and 640 carrying signal MEM_FULL are connected to the first latches 450, 650 and 250 respectively of the subsequent memory modules through lines 430, 630 and 230. Lines 330a–k, 530a–k and 730a–k carrying the signal to indicate the detection of a marker in an output buffer queue 280a–k, 480a–k and 680a–k are connected to the latches 540a–k, 740a–k and 340a–k respectively, of the subsequent memory module.

The modules are connected together in a ring so that the last memory module shown at the bottom of FIG. 2 is connected to the memory module shown at the top of the FIG. 2. Thus when the memory controller 700 detects that the memory 690 of the nth memory module is full, the MEM_FULL signal is sent along lines 640 and 230 to the input of first latch 250 of the first memory module and future packets will then be stored in the output queues 280a–k of the first module. It should be noted that it is not necessary for a memory module to be completely empty before it can accept new entries in the output queues 280a–k, since all of the new entries will be placed behind the markers in the output queues 280a–k. These markers divide the older entries from the new entries and ensure, as described earlier, that older entries in the output queues 480a–k, 680a–k of the subsequent memory modules are read out before the newer entries of the output queues 280a–k of the current memory module.

Similarly when all of the packets stored in one of the output queues 680a–k of the nth memory module have been read out and the marker detected by the appropriate one of the series of detectors 710a–k, a signal is sent via one of the lines 730a–k to set the corresponding one of the second latches 340a–k in the first memory module and so allow the next packets to be read out of the respective one of the output queues 280a–k. In FIG. 2 only three memory modules are shown by way of example. It is, however, obvious for any number of memory modules to be connected together.

While the invention has been particularly shown and described with reference to the preferred embodiment thereof, it will be understood by those skilled in the art that various changes in form and detail may be made therein without departing from the spirit and scope of the invention.

Having thus described our invention, what we claim as new and desire to secure by Letters Patent is:

1. A buffer memory for use in a data packet switch in a packet switched network having a plurality of input lines for inputting data into said buffer memory and a plurality of switch output lines for outputting data from said buffer memory, comprising:

a plurality of memory modules, each one of said memory modules containing a memory component and a corresponding memory control, said plurality of memory modules being connected in a sequential structure such that for each memory module there is a previous memory module and a next memory module;

wherein each of said memory components is connected separately to each of said plurality of input lines and separately to each of said plurality of switch output lines; and wherein said each memory control provides a plurality of logical FIFO output queues of variable size in its corresponding memory component, each of said plurality of switch output lines having an associated logical FIFO output queue in each of said memory components, with separate readout control and gating means being provided between each of said switch output lines and each of its associated logical FIFO output queues.

2. The buffer memory of claim 1 wherein said separate readout control and gating means enable the readout of data packets for each of said switch output lines only from one of its associated logical FIFO output queues at a time, and enable switching the readout of data packets for said each switch output line from the associated logical FIFO output queue in one memory module to the associated logical FIFO output queue in the next memory module independent of the readout for all other switch output lines from their associated logical FIFO output queues.

3. The buffer memory of claim 1 wherein each memory module includes:

a plurality of AND gates each having a first input that connects a corresponding one of said plurality of input lines to said memory component of said each memory module;

a first latch, having an output line connected to a second input of each of said plurality of AND gates, said first latch being set by a MEM_FULL signal sent from the corresponding memory control of the previous memory module, and being reset by a MEM_FULL signal of the corresponding memory control of said each memory module, the MEM_FULL signal indicating that said memory component of said each memory module can store no further data.

4. The buffer memory of claim 3 wherein:

each of said plurality of memory modules provides a marker circuit which inserts a marker into each of said plurality of FIFO output queues when said MEM_FULL signal is received from said corresponding memory control; said marker, which is independent of the data packets in the associated logical FIFO output queue and which is inserted in a separate position Of the associated logical FIFO output queue, indicating the end of a partial data packet queue and that a following partial data queue for the same switch output line is contained in the corresponding FIFO output queue of the next memory module.

5. The buffer memory of claim 4 wherein each of said separate readout control and gating means includes:

gating circuitry for gating data packets from each logical FIFO output queue to its associated switch output line;

a second latch connected to a corresponding input of said gating circuitry; and a marker detector connected to a resetting input of said second latch and to a setting input of the second latch of the corresponding readout control and gating circuitry in the next memory module; the gating circuitry, second latches and marker detectors being interconnected so that for each of said plurality of switch output lines, data packets from the associated logical FIFO output queue of one of said memory modules are gated to the associated switch output line until said marker detector reads out said marker from said associated logical FIFO output queue, said marker detector then activating a signal on its output line for resetting the corresponding second latch in the same memory module and setting the corresponding second latch in the next memory module.

\* \* \* \* \*